United States Patent [19]

Isler

[11] Patent Number: 5,022,791
[45] Date of Patent: Jun. 11, 1991

[54] PROCESS, ANCHORING MEMBER, AND CLAMPING DEVICE FOR CLAMPING A ROD

[75] Inventor: Erwin Isler, Rapperswil, Switzerland

[73] Assignee: H. Weidmann AG, Rapperswil, Switzerland

[21] Appl. No.: 475,495

[22] Filed: Feb. 6, 1990

[30] Foreign Application Priority Data

Feb. 6, 1989 [CH] Switzerland ............... 401/89

[51] Int. Cl.⁵ .................................... E21D 21/00
[52] U.S. Cl. ......................... 405/260; 254/29 A; 411/266; 411/433; 405/259
[58] Field of Search .............. 405/259, 260, 261; 254/29 A; 52/230; 411/266, 267, 268, 269, 433

[56] References Cited

U.S. PATENT DOCUMENTS

| | | | |
|---|---|---|---|
| 1,143,005 | 6/1915 | Weston | 411/267 X |
| 3,151,653 | 10/1964 | Zahodiakin | 411/267 |
| 3,653,634 | 4/1972 | Bechi | 254/29 A |
| 4,106,752 | 8/1978 | Roqueta | 254/29 A |
| 4,369,003 | 1/1983 | Brandstetter | 405/260 |
| 4,405,114 | 9/1983 | Macchi | 254/29 A |
| 4,449,855 | 5/1984 | Langwadt | 405/260 |
| 4,664,573 | 5/1987 | Isler et al. | 411/5 |
| 4,809,952 | 3/1989 | Joubert et al. | 254/29 A |
| 4,846,444 | 7/1989 | Vassalotti | 254/29 A |

FOREIGN PATENT DOCUMENTS 0094908 11/1983 European Pat. Off. .
1327230 4/1963 France .

*Primary Examiner*—Dennis L. Taylor
*Attorney, Agent, or Firm*—Sughrue, Mion, Zinn, Macpeak & Seas

[57] ABSTRACT

A nut 15 for clamping a tie rod securing a rock has a tubular nut body 25 with a buttress thread 28. The nut body is subdivided into segments 31 by several elongated slots 30. The segments are connected by elastic ribs 26 whose cross-section is U shaped. On one end of the face the nut has a convex spherical end flange 17 which rests against an anchor plate 19. The slots extend through the flange as far as the inner wall of the ribs. Between the ribs the flange has radial notches 37, which extend as far as the nut body. In this manner the segments 31 are tangentially flexible. To clamp the tie rod, the nut is slid axially on the buttress thread of the rod. A clamping device with jaws reaches into the thread of the rod at its free end, and rests against the nut 15. When the tie rod is pulled with the jaws, the nut 15 is simultaneously forced against the anchor plate. Thus, a fast and accurate preliminary clamping of the tie rod is achieved.

10 Claims, 4 Drawing Sheets

5,022,791

PROCESS, ANCHORING MEMBER, AND CLAMPING DEVICE FOR CLAMPING A ROD

BACKGROUND OF THE INVENTION

When securing rock, e.g. in tunneling or mining draw bolts are used with a tie rod that is anchored in the rock and on whose free end a nut is screwed. The nut rests against an anchor plate, which rests against the rock. In the case of steel draw bolts, the nut is usually tightened with a torque wrench. This clamping process is quite inaccurate because the torque applied with the wrench has a relatively wide range of fluctuation, and the process of setting the anchor plate can reduce the rod tension in an uncontrolled manner.

In the case of draw bolts made of fiber reinforced plastic, this clamping process is inapplicable because the fiber reinforced tie rods have only negligible torsional strength.

A process is known for clamping or prestressing tie rods made of fiber reinforced plastic, as described in U.S. Pat. No. 4,523,880. The free end of the rod has a buttress thread on which a nut is screwed. The nut bears against an anchor plate. To date a device has been used to clamp this anchor, such device having an auxiliary nut which is screwed on the free end of the rod, outside the main nut. The auxiliary nut can be axially moved by a hydraulic cylinder in the frame of the device. The frame has a tripod, which is braced against the rock outside the tie plate. When the cylinder is loaded, the auxiliary nut preliminarily clamps or prestresses the tie rod and the nut can then be tightened against the anchor plate by hand. This process and this device are quite complicated.

SUMMARY OF THE INVENTION

The present invention is based on the technical problem of improving the aforementioned prior art process, the anchoring member and the related clamping device in such a manner that the rod can be quickly clamped or prestressed.

DETAILED DESCRIPTION OF THE PREFERRED EMBODIMENT

Figure 1:
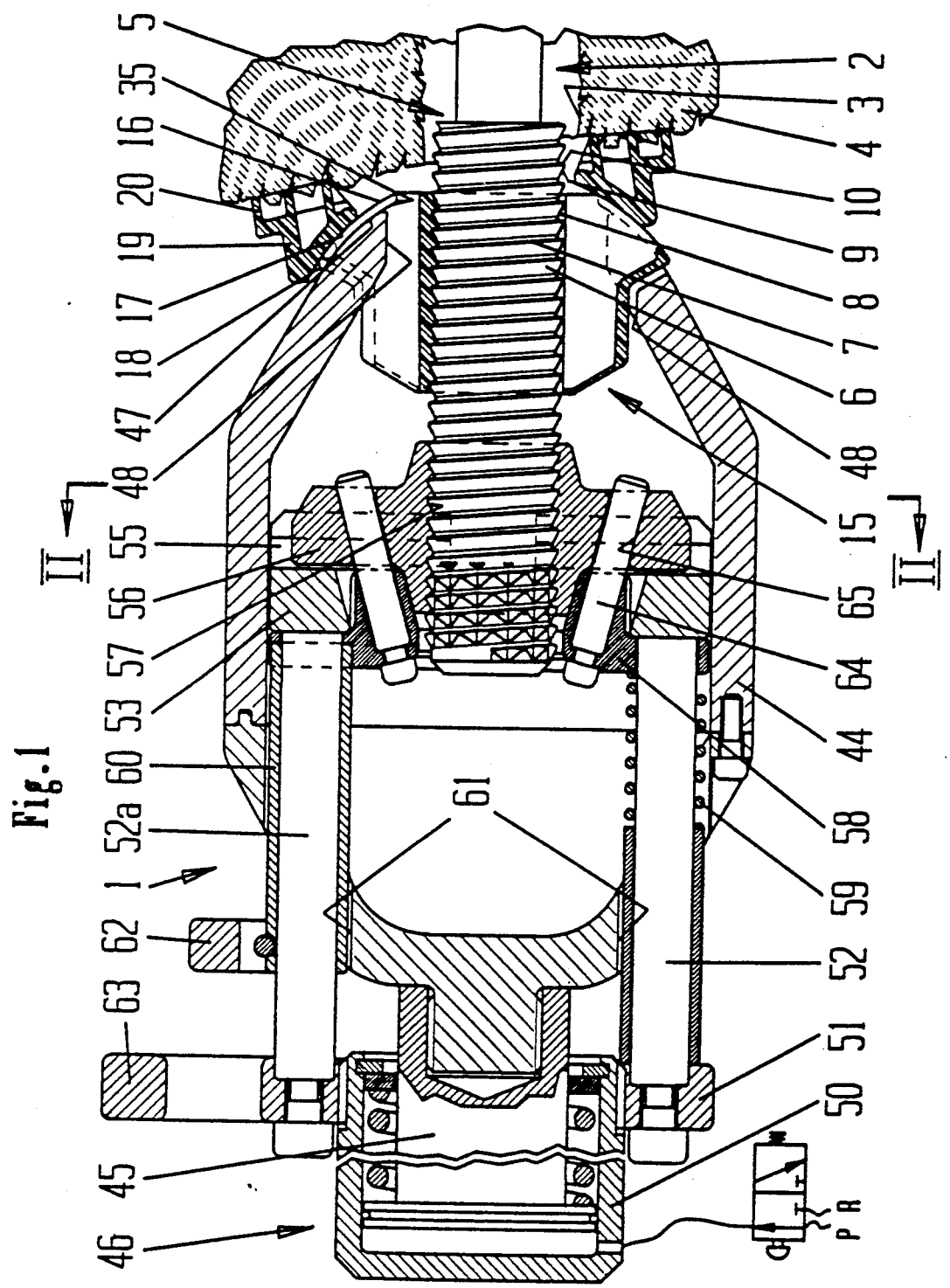
FIG. 1 is an axial view of a clamping device in accordance with the invention.
Figure 2:
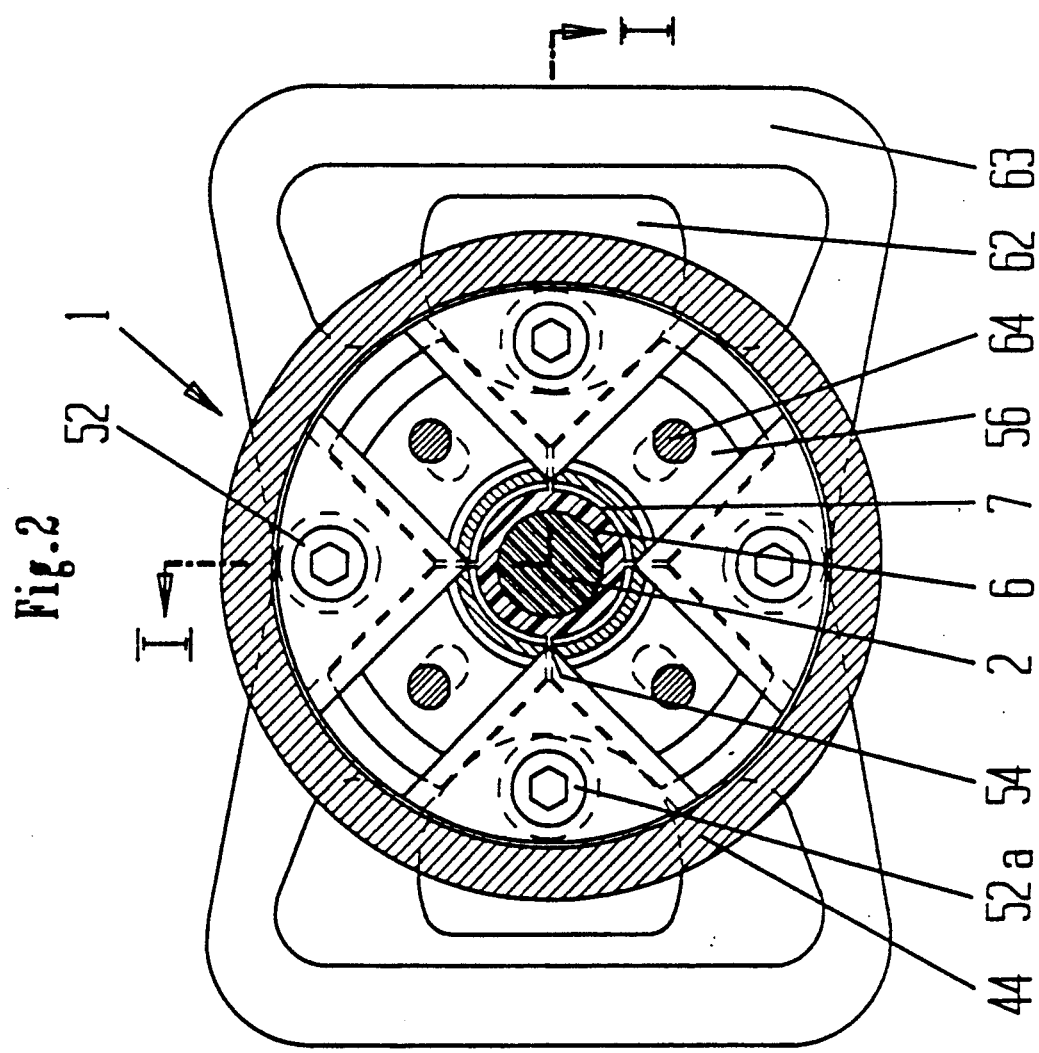
FIG. 2 is a sectional view along line II—II of FIG. 1.
Figure 3:
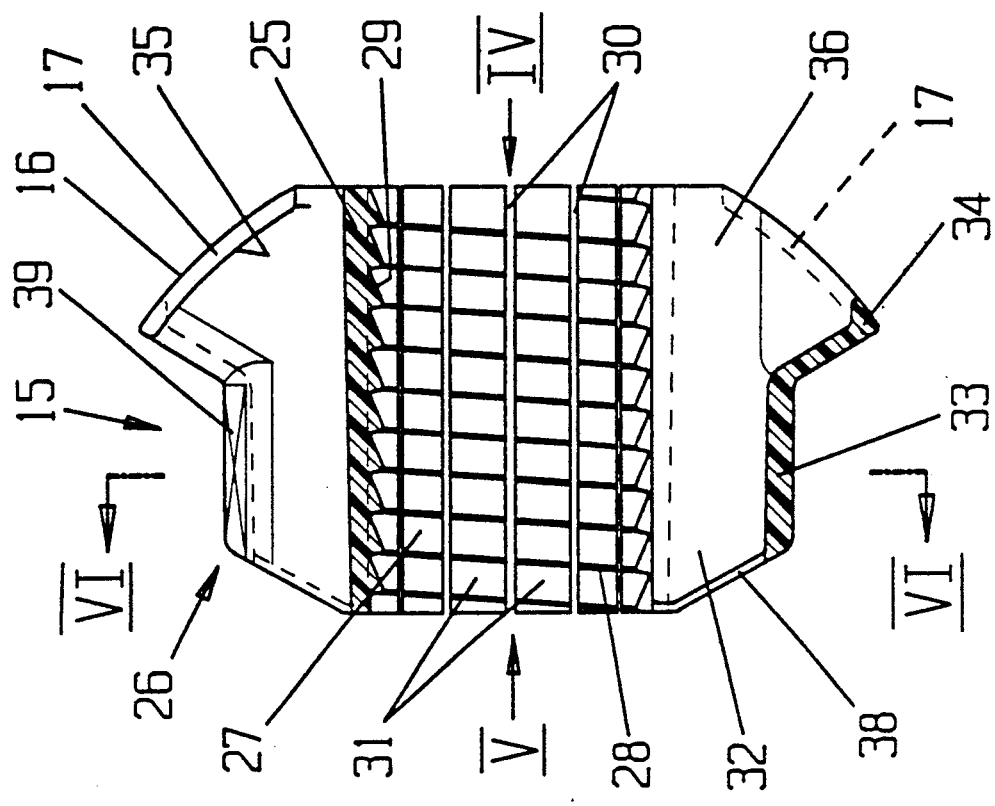
FIG. 3 is an axial view of a nut along line III—III of FIG. 4
Figure 4:
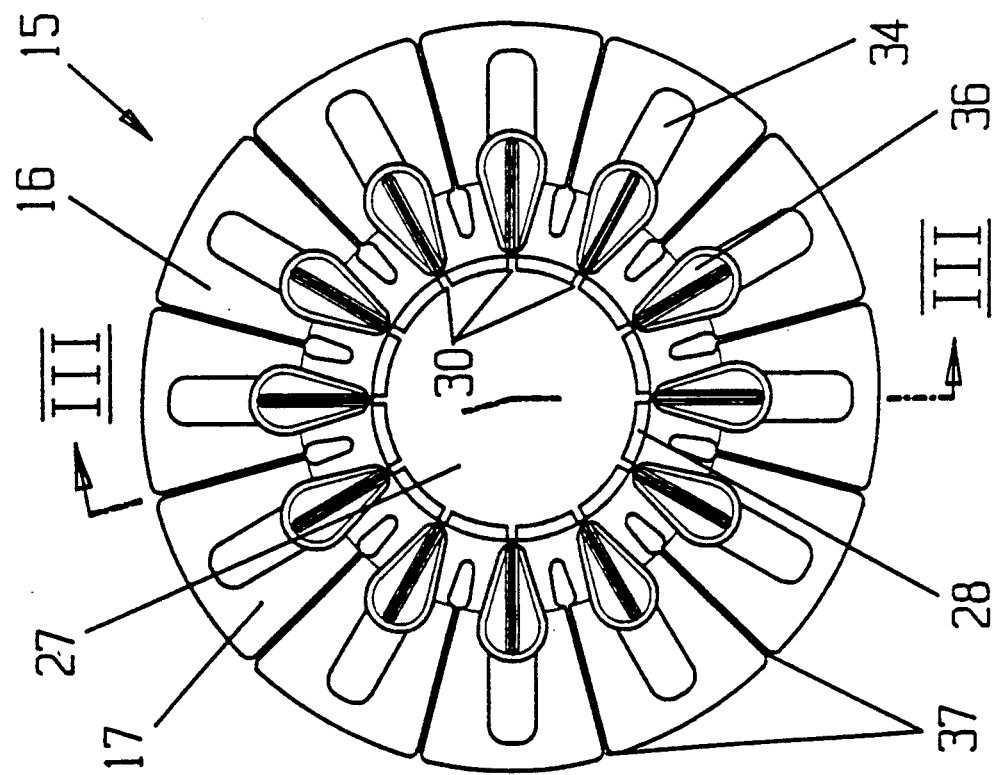
FIGS. 4 and 5 are two end views of the nut of FIG. 3 in the direction of arrows IV and V of FIG. 3.
Figure 6:
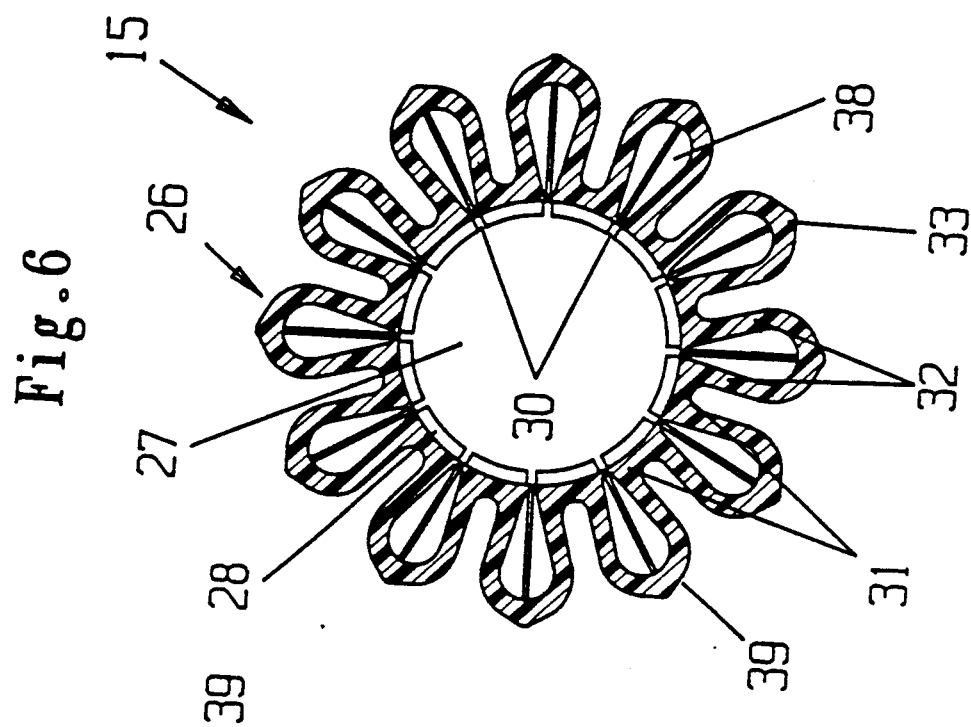
FIG. 6 is a cross-sectional view along the line VI—VI of FIG. 3.
Figure 5:
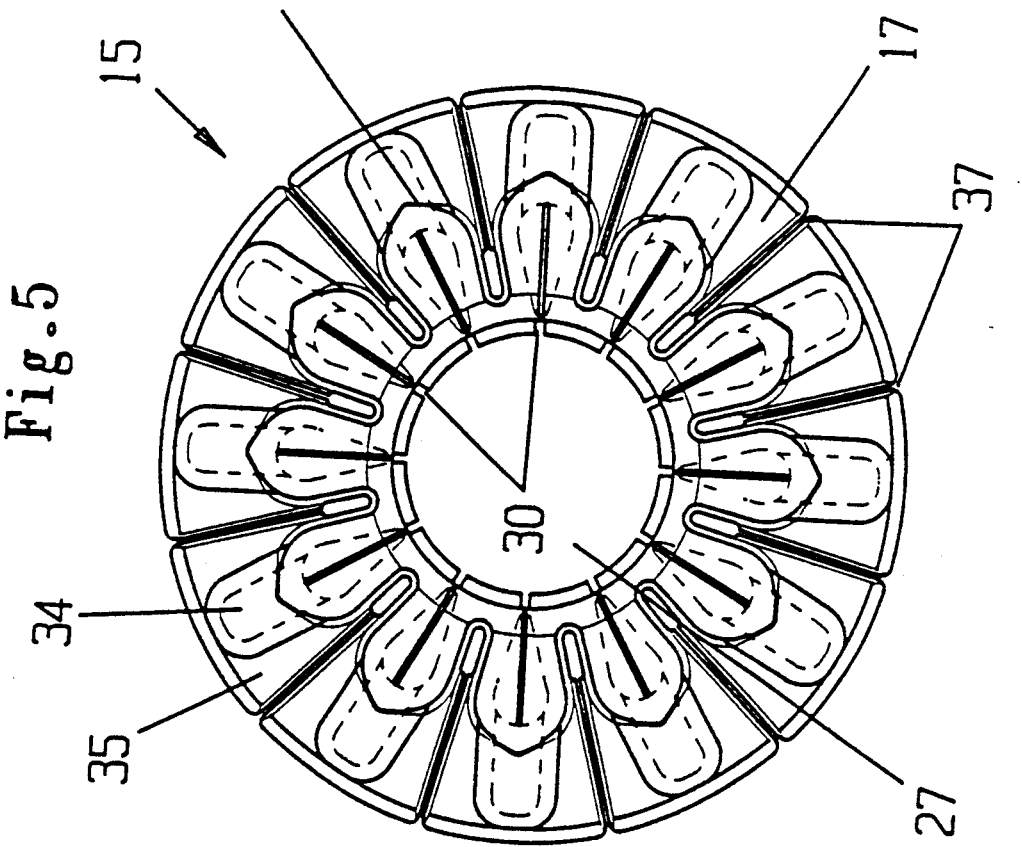

The clamping device 1, shown in FIGS. 1 and 2, serves the purpose of clamping a fiber reinforced plastic tie rod 2. The rod 2 is shown in a borehole 3 in the rock, wherein only the section 5 in the vicinity of its free end can be seen. It can be designed at the anchoring end in accordance with U.S. Pat. No. 4,523,880. A sleeve 6 that is made of fiber reinforced plastic and has a buttress thread 7 on its outer perimeter, is moulded on the end section 5. The sawtoothed grooves 8 of the thread 7 have flat flanks 9 facing the free end of the rod and steep flanks 10 turned away from the end of the rod.

A nut 15 acting as an anchoring member is set on the thread 7. The nut rests With a convex-spherical outer side 16 of an end flange 17 on a concave spherical surface 18 of an anchor plate 19. The anchor plate 19 rests with crumpling fins 20 against the rock 4. The nut 15 is shown in detail in FIGS. 3 to 6. It is injection moulded of fiber reinforced plastic and comprises a tubular nut body 25, ribs 26 that are moulded onto the body, and the end flange 17. A buttress nut thread 28 with sawtooth configured grooves 29 that match the sleeve grooves 8 is moulded in the axial through-hole 27 of the body 25. The body 25 is subdivided into twelve segments 31 by elongated or longitudinal slots 30. The ribs 26 are U shaped in cross-section with radially oriented U-shaped legs 32 and a somewhat roof-shaped connecting section 33. The ribs 26 are elastic and connect the segments 31 to one another so that they are tangentially flexible relative to one another. They are, however, rigid radially relative to the ribs 26. In the direction of the flange 17, the sections 33 transform into semi-cylindrical paths 34, which are inclined relative to the axis of the nut body 25 and which brace the outer region of the flange 17, projecting above the outer diameter of the ribs 26, against the ribs 26. The sections 33 form a double hexagonal head 39, so that the nut 15 can be tightened or in any event loosened with a wrench. Opposite the spherical outer surface 16, the end flange 17 has a concave spherical inner surface 35. The space enclosed by the legs 32, the section 33 and the path 34 extends as an opening 36 through the flange 17 so that in the end flange 17 the slots 30 reach up to the inner wall of the paths 34. Between the ribs 26 the end flange 17 has radial slits 37, which extend as far as the nut body 25. This design does not have a negative impact on the elasticity of the ribs 26 and paths 34 due to the flange 17. At the opposite end, the space enclosed by the ribs 26 is closed by means of floors 38. The slots 30 in turn extend into these floors radially as far as the inner wall of the sections 33.

According to FIG. 1, the clamping device 1 has a housing 44 screwed at the rear axial end to a piston rod 45 of a single acting hydraulic cylinder unit 46. The front of the housing 44 has a convex-spherical face 47 in order to mate with the concave-spherical inner surface 35 of the flange 17, and an axial opening 48 in order to envelop the ribs 26. The face 47 acts as a support element to support the clamping device 1 at the nut 15. A ring 51 is screwed on the front end of the cylinder 50 of the cylinder unit 46. The ring bears four rods 52 extending parallel to the axis of the device 1. A carrier 53 with a through-hole 54 through which the sleeve is guided is screwed firmly on the front end of the rods 52. The front face of the carrier 53 has four radial T-shaped grooves 55. Four jaws 56 can be moved radially in these grooves 55. The jaws 56 have sawtooth configured nut thread grooves 57 in order to engage with the grooves 8 of the rod 2. On the rear of the carrier 53 a coaxial actuating ring 58 can be moved axially on the rods 52 and preloaded by means of pressure springs 59 against the carrier 53. One sleeve 60 can be moved on two of the four rods 52a. The sleeves 60 are rigidly connected to the ring 58 and project towards the rear through a bore 61 of the housing 44. An actuating handle 62 is fastened on the rear end of each sleeve 60. The handle is adjacent to a handle 63 moulded on the ring 51. Four pins 64 are fastened in the actuating ring 58, tilted to the axis of the housing 44. The pins 64 penetrate bores 65 in the jaws 56. They are shown offset by 45° in FIG. 1.

In operation, after the tie rod 2 has been set in the borehole 3, the anchor plate 19 is placed against the rock 4 and the nut 15 to rest against the anchor plate 19 is slid on the sleeve 6, wherein due to the tangentially elastic segments 31 the nut 15 needs only to be slid or pushed on axially, which is much faster than screwing. At this stage the clamping device 1 is grasped at the handle 63 and at the same time the actuating handle 62 is pulled back. In this manner the ring 58 moves against the force of the springs 59 away from the carrier 53 and the pins 64 move the jaws 56 radially towards the outside so that the device 1 can be mounted over the sleeve 6 until he face 47 rests on the inner surface 35. When the actuating handle 62 is released, the ring 58 is pushed forward by means of the springs 59 and the pins 64 push the jaws 56 radially inwards in order for the jaw grooves 57 to engage with the rod grooves 8. At this stage the cylinder unit 46 is loaded with pressurized oil. The piston rod 45 pushes the housing 44 and thus the face 47 forward and the cylinder 50 pulls the jaws 56 towards the rear by the rods 52 and the carrier 53. Thus, the rod 2 is clamped or prestressed and at the same time the nut 15 is forced with the counterforce to rest against the anchor plate 19. wherein in turn the grooves or flutes 8 of the sleeve 6 are skipped due to the tangential elasticity of the segments 31. The spherical face 47 supports the spreading of the nut 15. Since the nut 15 is also forced against the anchor plate 19 with the entire preliminary clamping or preload force of the rod 2 when the rod is preliminarily clamped. The anchor plate braces itself firmly with its crumpling fins 20 against the rock 4 so that when the cylinder unit 46 is depowered. A precise preliminary clamping of the rod that can be accurately metered by the set hydraulic pressure is produced. After the cylinder unit 46 has been depowered, the jaws 56 are opened by pulling the actuating handle 62 and the clamping device 1 is pulled away axially from the free end of the rod. Due to the radial components of the supporting force on the end flange 17, which is transferred by means of the radially rigid ribs 26 directly to the segments 31, the segments 31 are radially compressed and thus the thread 28 of the nut is firmly engaged with the thread of the rod. In addition, the transfer of force from the sleeve 6 to the tie rod 2 is significantly improved by this radial compression.

The described clamping device 1 and the nut 15 enable an extremely fast clamping of the tie rod 2 with an accuracy and repeatability of the preliminary clamping that is significantly improved with respect to the prior art clamping processes with anchoring elements In this manner optimal use can be made of the a ultimate strength of the tie rod 2.

The described anchoring member (nut 15) and the described clamping process are also suitable in principle when the grooves 8 of the rod, the grooves 29 of the anchoring member, and the grooves 57 of the jaw are annular and thus do not form a helical thread. In this case cross-sections of the rod that are other than round are also suitable.

I claim:

1. A method for prestressing a tie rod while simultaneously forcing an anchor member, mounted on the tie rod, against an anchor plate, the tie rod being anchored in the rock for securing the rock and having a free end formed with a plurality of sawtooth configured grooves therein, said method comprising the steps of:

(a) placing an anchor plate over the free end of said tie rod and against the rock;
   (b) sliding the anchor member over the free end of said tie rod and against said anchor plate;
   (c) clamping the free end of the tie rod by means of a clamping device, said clamping device including an anchoring element for engaging the sawtooth configured grooves of the tie rod, said clamping device resting exclusively against the anchor member; and
   (d) preloading the tie rod with a preloading force while simultaneously forcing the anchor member against the anchor plate with a force corresponding to the preloading force of the tie rod.

2. An anchoring member for anchoring a rod, the rod being anchored in rock for securing the same, the rod having a free end protruding from the rock, said anchoring member comprising:

(a) a tubular body having sawtooth configured grooves in an axial passage opening and adapted to engage with sawtooth configured grooves on the free end of the rod;
   (b) a plurality of radially projecting ribs molded onto said tubular body and extending in an axial direction, each of said plurality of ribs being U-shaped in cross-section; and
   (c) a plurality of slots extending in an axial direction and thereby subdividing said tubular body into a plurality of segments, wherein said ribs are elastic and connect said segments to one another such that said segments are flexible relative to one another in a tangential direction but nonflexible relative to said ribs in a radial direction.

3. The anchoring member according to claim 2, wherein an end flange is molded onto said ribs at one axial end, said slots extending through said end flange and projecting in said end flange approximately as far as an inner wall of said ribs, said end flange further including radial slits which extend from an outer periphery of said end flange between said ribs, said radial slits projecting inwardly as far as the region of said tubular body.

4. The anchoring member according to claim 3, wherein said end flange extends radially over an outer diameter of said ribs, said end flange including a convex-spherical outer surface and a concave-spherical inner surface, a region of said end flange outside said ribs being supported on said ribs by means of a plurality of corresponding paths.

5. The anchoring member according to claim 4, wherein said sawtooth configured grooves of said tubular body are helical shaped and form a buttress thread.

6. The anchoring member according to claim 5, wherein said anchoring member includes twelve said slots and twelve said ribs, each of said ribs having a radially roof-shaped section on an outside portion thereof, thereby forming a double hexagonal adapted to be engaged by a double hexagonal wrench.

7. The anchoring member according to claim 6, wherein said anchoring member is made of fiber reinforced plastic.

8. A prestressing device for prestressing a tie rod while simultaneously forcing an anchor member, mounted on the tie rod, against an anchor plate, the tie rod being anchored in rock for securing the rock, said prestressing device comprising:

(a) a housing including an anchoring element having sawtooth configured grooves and which is moved in an axial direction and adapted to engage with sawtooth configured grooves of the tie rod at an end section in the vicinity of a free end of the tie rod;

(b) a supporting element connected to said housing and including a coaxial opening through which the tie rod is passed, said supporting element adapted to rest exclusively against the anchoring member mounted onto the tie rod; and (c) an actuating member for moving said anchoring element in an axial direction relative to said supporting element.

9. The prestressing device according to claim 8, wherein said anchoring element is formed by several jaws that are moved out of a base position in which said sawtooth configured grooves of said anchoring element engage with said sawtooth configured grooves of the tie rod, said jaws are moved into a radially configured grooves of said anchoring element.

10. The prestressing device according to claim 9, wherein said supporting element is a convex-spherical face of said housing that rests against a concave-spherical inner surface of an end flange of the anchoring member.

* * * * *